Patented Nov. 25, 1952

2,619,466

UNITED STATES PATENT OFFICE 2,619,466

MERCAPTAN-ETHYLENE OXIDE CONDENSATION PRODUCTS OF REDUCED POUR POINT

Robert L. Wolf, Richmond, Va., assignor to Monsanto Chemical Company, St. Louis, Mo., a corporation of Delaware No Drawing. Application May 31, 1949,
Serial No. 96,403

5 Claims. (Cl. 252—89)

This invention relates to tertiary mercaptan-ethylene oxide condensation products of reduced pour point.

An object of the present invention is the provision of a product consisting of the tertiary mercaptan-ethylene oxide condensation product and water, which product has a pour point considerably lower than that of the anhydrous material.

The condensation product of tertiary mercaptans with ethylene oxide may be prepared by the method described in pending application Serial No. 718,133, filed December 23, 1946, which application is assigned to the same assignee as is the present invention. According to the process described in said application, condensation products are prepared by passing ethylene oxide in the gas or liquid form into a tertiary mercaptan having at least 8 carbon atoms and up to 18 carbon atoms in the molecule, which mercaptans are derived from a polymerized olefin. The tertiary mercaptan derived from a polymerized olefin may be prepared as described in U. S. Patent No. 2,378,030 or U. S. Patent No. 2,392,555.

The condensation products of the tertiary mercaptans with ethylene oxide may be prepared in a manner similar to that described in U. S. 2,205,021, describing the condensation of primary mercaptans usually with the aid of an alkaline catalyst.

According to the process described in said pending application Serial No. 718,133, products containing from 5 to 40 moles of condensed ethylene oxide per mole of mercaptan may be prepared. For detergent purposes, however, condensation products containing at least 5 but less than 25 moles, that is, from 5 moles to about 20 moles of condensed ethylene oxide per mole of mercaptan are preferred. These products are oily liquid to semi-liquid products, showing a tendency to solidify upon cooling to about 35° F. to 45° F.

For the purpose of ease in handling these condensation products, it is advantageous to have compositions which have a pour point not above about 30° F. and preferably below about 20° F. The products of reduced pour point are more easily handled in those operations where it is necessary to pour the same into containers or where it is desired to mix the products with alkaline salt builders for the purpose of producing detergents.

I have now found that the addition of certain restricted amounts of water to the tertiary mercaptan-ethylene oxide condensation product results in a sharp drop of the pour point. In general, the addition of large amounts of water are to be avoided because of undesirable dilution effects. For most purposes, the amount of water should be restricted to from about 1% to about 48% and preferably to about 10% to about 25% by weight of the condensation product.

For the purpose of illustrating the above effect, the following results were obtained by the addition of water to the condensation products of tertiary dodecyl mercaptan with 7.8 and 10.5 moles of ethylene oxide per mole of mercaptan respectively.

| Composition | Ethylene Oxide/Mercaptan Molar Ratio | Pour Point, °F. |
|---|---|---|
| Condensation Product+0% water | About 10.5/1 | +45 |
| 95% Condensation Product+5% water | do | +30 |
| 90% Condensation Product+10% water | do | −15 |
| 85% Condensation Product+15% water | do | −20 |
| 75% Condensation Product+25% water | do | −40 |
| 55% Condensation Product+45% water | do | +30 |
| 54% Condensation Product+46% water | do | +35 |
| 52.5% Condensation Product+47.5% water | do | +40 |
| 50% Condensation Product+50% water | do | +50 |
| Condensation Product+0% water | About 7.8/1 | +35 |
| 99% Condensation Product+1% water | do | +30 |
| 95% Condensation Product+5% water | do | −5 |
| 90% Condensation Product+10% water | do | −40 |
| 85% Condensation Product+15% water | do | −30 |
| 75% Condensation Product+25% water | do | −25 |
| 54% Condensation Product+46% water | do | +25 |
| 52% Condensation Product+48% water | do | +30 |
| 50% Condensation Product+50% water | do | +35 |

The compositions above disclosed are prepared by adding the desired quantity of water to the condensation product, solution thereof being added by stirring the mixture.

The pour points given above were determined by the standard ASTM method, which is described in ASTM Standards 1946 designation D97-39.

What I claim is:

1. A new composition of matter consisting of a solution containing from 90% to 75% by weight of a condensation product of a tertiary mercaptan containing from 8 to 18 carbon atoms per mole with 5 to 40 moles of ethylene oxide per mole of mercaptan, and from 10% to 25% by weight of water.

2. A new composition of matter consisting of a solution containing from 90% to 75% by weight of the condensation product of one molecular proportion of tertiary dodecyl mercaptan with about 10.5 moles of ethylene oxide, and from 10% to 25% by weight of water.

3. A new composition of matter consisting of a solution containing 85% by weight of the condensation product of one molecular proportion of tertiary dodecyl mercaptan with about 10.5 moles of ethylene oxide, and 15% by weight of water.

4. A new composition of matter consisting of a solution containing from 90% to 75% by weight of the condensation product of one molecular proportion of tertiary dodecyl mercaptan with about 7.8 moles of ethylene oxide, and from 10% to 25% by weight of water.

5. A new composition of matter consisting of a solution containing 85% by weight of the condensation product of one molecular proportion of tertiary dodecyl mercaptan with about 7.8 moles of ethylene oxide, and 15% by weight of water.

ROBERT L. WOLF.

REFERENCES CITED

The following references are of record in the file of this patent:

UNITED STATES PATENTS

| Number | Name | Date |
| --- | --- | --- |
| 2,565,986 | Olin | Aug. 28, 1951 |
| 2,570,050 | Eby | Oct. 2, 1951 |